(12) United States Patent
Russeff

(10) Patent No.: US 9,683,177 B2
(45) Date of Patent: Jun. 20, 2017

(54) LEAN OIL ABSORPTION AND STABILIZATION

(71) Applicant: UOP LLC, Des Plaines, IL (US)

(72) Inventor: Richard L. Russeff, Bartlesville, OK (US)

(73) Assignee: UOP LLC, Des Plaines, IL (US)

( * ) Notice: Subject to any disclaimer, the term of this patent is extended or adjusted under 35 U.S.C. 154(b) by 192 days.

(21) Appl. No.: 14/608,530

(22) Filed: Jan. 29, 2015

(65) Prior Publication Data

US 2015/0218460 A1 Aug. 6, 2015

Related U.S. Application Data

(60) Provisional application No. 61/934,148, filed on Jan. 31, 2014.

(51) Int. Cl.
*B01D 53/14* (2006.01)
*C07C 7/04* (2006.01)
*C10G 5/04* (2006.01)

(52) U.S. Cl.
CPC ........... *C10G 5/04* (2013.01); *B01D 53/1487* (2013.01); *B01D 2252/205* (2013.01); *B01D 2256/245* (2013.01); *C10G 2300/1025* (2013.01)

(58) Field of Classification Search
CPC ........ B01D 2252/205; B01D 2256/245; B01D 53/1487; C10G 5/04
See application file for complete search history.

(56) References Cited

U.S. PATENT DOCUMENTS 3,844,898 A * 10/1974 De Graff ................ B01D 3/141
196/100
4,070,165 A * 1/1978 Colton .................. B01D 53/14
62/621

* cited by examiner

*Primary Examiner* — Christopher P Jones
*Assistant Examiner* — Cabrena Holecek

(57) ABSTRACT

The invention provides a process and a system for processing hydrocarbon streams efficiently, especially natural gas streams that contain natural gas liquids including propanes, butanes, pentanes and higher hydrocarbons. A lean oil absorber is used to separate natural gas liquids, a side stripper with a side stripper reboiler is used to separate a propane/butane stream and a stabilizer reboiler is used to stabilize a natural gasoline product stream.

6 Claims, 1 Drawing Sheet

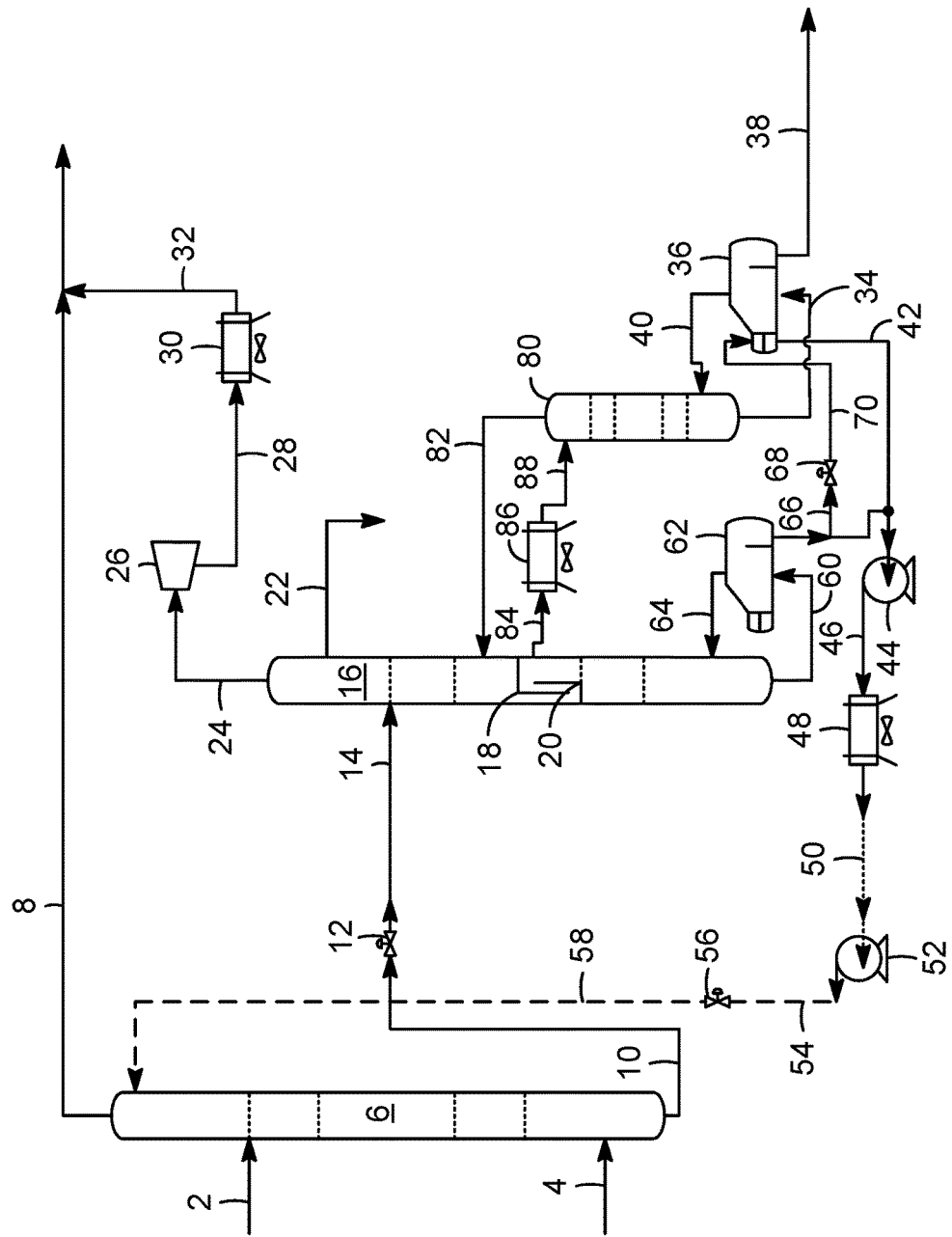

LEAN OIL ABSORPTION AND STABILIZATION

CROSS-REFERENCE TO RELATED APPLICATION

This application claims priority from Provisional Application No. 61/934,148 filed Jan. 31, 2014, the contents of which are hereby incorporated by reference.

BACKGROUND OF THE INVENTION

Lean oil absorption has been used in gas condensation units such as hydrocrackers, cokers, and FCCU technology. The lean oil is a product of the cracking process, so it has been used in an absorber to capture the light ends from cracking. Lean oil is not as effective as other technologies for capturing ethane, such as the Gas Subcooled Process (GSP) from Ortloff Engineers. However, as a feed pretreatment for GSP and similar units, lean oil absorption units have the ability to decrease the concentration of targeted species, such as propane and ethane.

Natural gas liquids (NGL's) are liquid hydrocarbons that are recovered from natural gases in gas processing plants, and in some cases, from field processing facilities. They include ethane, propane, butanes, pentanes and heavier components. These hydrocarbons exist as gases in the reservoir. The heaviest hydrocarbons (pentanes and heavier) that condense when they reach the surface separators due to reduction in temperature are termed condensate or natural gasoline. It is sometimes necessary to extract these hydrocarbons to prevent their forming hydrates. With a few exceptions, these NGL's are generally more valuable as petrochemical feedstock than as produced gas, and can be recovered from natural gas streams as a liquid product and sold separately from the pipeline gas.

Lean oil absorption is a process in which the NGL's are removed by contacting the natural gas with a liquid hydrocarbon solvent (oil). After this lean oil absorbs the NGL's in an absorber column, the resulting rich oil is subjected to a distillation process to separate NGL's for sale and recycling the regenerated lean oil to the absorber column. Although first developed in 1911, the basic absorption process has been modified and improved in response to the market forces and technological advances.

In the ambient lean oil absorption process the natural gas is contacted with the lean oil (molecular weight of about 150) in an absorber column at the ambient temperature of about 38° C. (100° F.). The rich oil exiting the bottom of the absorber flows into a rich oil depropanizer (ROD) which separates the propane and lighter components and returns them to the gas stream. The rich oil is then fractionated in a still, where the NGL's (C4+) are recovered as an overhead product and the lean oil is recycled to the absorber column. Typically, 75 percent of butanes and 85-90 percent of pentanes and heavier components are recovered. In the refrigerated lean oil absorption process, the lean oil is chilled against propane refrigerant to improve the recovery of propane to the 90 percent level, and depending upon the gas composition, up to 40 percent of ethane may be recovered. Since reducing the molecular weight of lean oil enhances the lighter component absorption and an external refrigerant is used to chill the lean oil, 100 to 110 molecular weight lean oils are generally used in this process.

There are several sources for lean oil within the gas processing patch as described below.

Purchase Lean Oil: Lean oil absorption and lean oil solvents were used in the early years of gas patch technology. Some companies still offer these lean oils today. Unfortunately, lean oil absorption using any solvent has been found to be not nearly as effective as GSP, so most producers no longer invest in the technology as a single technology for recovery. Purchased lean oil is typically heavier solvent with a composition similar to kerosene, diesel, or light cycle oil. These heavy solvents were desirable because they were heavier in molecular weight. The heavier oil losses within the absorber tower were minimized. The solvent was not produced within the gas patch recovery units. Makeup solvent tanks and solvent recovery systems were required.

Low Pressure Drip: Low pressure drip occurs in the field or on the outlet of low pressure pipelines from condensed liquids, 345 to 1724 kPa (50 to 250 psi). Additional drip can also occur at compression interstage knockout drums. Typically, most gas producers stabilize this drip to 62 to 97 kPa (9 to 14 psi) Reid vapor pressure (RVP) in a stabilizer column. The stabilized drip is then sold to refineries for blending stock.

Some gas producers cannot effectively stabilize the low pressure liquid drip because they do not have a stabilizing column. The low pressure drip is sent to tanks where the light ends are allowed to weather off to stabilize the bulk liquid for transport.

At low pressure, the liquids are at equilibrium with the vapor in the pipeline. They are saturated. However, increasing the pressure of the vapor and liquid will cause more of the components in the vapor to be absorbed into the liquid. Since the low pressure drip liquid has considerable amounts of lighter components within the liquid phase, it is only mildly effective as lean oil.

Stabilized Gasoline: Most gas processing units in the field who collect the liquid drip from either high pressure (pipeline or GSP feed pressure) or low pressure drip stabilize the liquid for sale in some manner. For transport and sale, the stabilized gasoline or natural gasoline must meet a 62 to 97 kPa (9 to 14 psi) RVP specification. From a component composition prospective, this means that ethane and propane have essentially been removed from the liquid (in some manner). Butanes and i-pentane may still be present, but in very small quantities. The RVP specification is most greatly affected by the presence of butane and i-pentane—they are the light keys of stabilizer splits. So an RVP specification of 62 to 97 kPa (9 to 14 psi) can be considered as de-butanization or de-i-pentanization. The lower the RVP, the less i-pentane will be present.

Stabilized gasoline is the best lean oil that is produced within typical gas processing plants without outsourcing a solvent.

If both low pressure drip and stabilized gasoline are available, both can be used in the absorber tower. Slow pressure drip can absorb a fair amount of lighter hydrocarbons, while the stabilized gasoline is less saturated, and can absorb more of the trace quantities. Therefore, the stabilized gasoline should be used as a finishing liquid at the top of the tower, while the low pressure drip will feed a few stages below in the absorber.

High Pressure Liquid Drip: High pressure drip liquid accumulates from feed compressor knock out drums (final stage), high pressure pipeline liquid slugs from slug catchers, or is a natural accumulation from the feed composition condensation in the feed system. This liquid is already saturated with light ends. However, it typically contains a heavier portion. This heavier portion, once stabilized as natural gasoline, can be used for lean oil. However, the high pressure liquid drip should be fed directly to the stabilizer if collected from an outside (upstream of the absorber) source.

For organically produced lean oil systems (C6+ condensable at site), a stabilizer with the side stripper is applied. This allows for outlet of the NGL material such that it does not build up in the lean oil. The stabilized gasoline is sent to the Absorber to absorb the C2+ material. The collected liquid at the bottom of the Absorber is stabilized, and the NGL and stabilized gasoline is sent to products. Part of the stabilized gasoline is recycled as cooled lean oil.

Lean oil can also be recycled to the top of the stabilizer. If there is significant flashing that occurs across the stabilizer feed control valve, considerable amounts of ethane and propane can be lost from the stabilizer system directly to the downstream GSP plant. Lean oil to the top of the stabilizer captures about 20% of ethane, about 40% of propane, and about 75% of butanes. There are some slight losses of lean oil by sending the stabilized gasoline to the top tray. High pressure liquid drip is sent directly to the stabilizer if required. This liquid may not always be present.

Low pressure liquid drip is sent a few trays down from the top tray in the absorber. Since the low pressure liquid is not saturated at high pressure, it is still effective lean oil at high pressure. It is not as effective as the stabilized gasoline as lean oil, so it is used whenever possible as the bulk absorbing liquid. The stabilized gasoline is the finishing absorption liquid.

The feed gas to the absorber will not be treated for water or CO2. The temperatures of the stabilizer feed flashes, but does not approach hydrate formation temperatures or CO2 freeze. However, water will be removed via the water draw on the first tray in the stabilizer.

The amount of lean oil to the stabilizer and absorber depends on process conditions, concentrations, and ambient air conditions. It is tuned to the individual conditions. In some cases, lean oil may be shut off to the stabilizer if there is not significant gain due to temperature.

A purchased lean oil absorber section can also be utilized on top of the primary absorber and on top of the stabilizer to absorber the gasoline. This liquid would have to be separate from the stabilized gasoline and completely collected at a total draw tray before the stabilized gasoline section. It would require a separate regeneration system.

Gas plant operations in the field currently have difficulties with accumulated liquids handling. These liquids include, but are not limited to: low pressure liquids, slug liquids from inlet slugs, winter temperature liquid knockout, feed composition richness from naturally occurring liquids, and liquids formed from onsite compression knockout. Additionally, gas plant operators are continually looking for ways to remove the richness from the gas so that their plants can process more gas and increase revenue. This flow scheme not only has the capabilities to processes all liquid that are formed from gas processing plants, but utilizes them as absorbing liquids to decrease the gas richness and increase overall capacity of NGL plants like GSP and cryogenic services.

This flow scheme collects the liquids and stabilizes them in two different product: on spec NGL (GPSA Section 2, FIG. 2-9) and stabilized natural gasoline, 62 to 97 kPa (9 to 14 psi) RVP. It uses stabilized natural gasoline as lean oil to absorb C2 to C5 material in the absorber from the feed to the downstream cryogenic plant to increase the cryogenic unit's capacity.

This process is employed at the cryogenic plant site that has liquid accumulation (other than those created in the cryogenic plant). This process is not sensitive to CO2 or water content in the feed. However, NGL product material may have to be treated with a small quantity of liquid-liquid contacting amine if there is too much CO2 in the feed in order to make pipeline CO2 specifications.

SUMMARY OF THE INVENTION

The invention provides a process for purifying a hydrocarbon stream comprising sending the hydrocarbon stream through a lean gas absorber, sending a vapor stream out a top of the lean gas absorber, sending a heavier hydrocarbon portion out a bottom of the lean gas absorber, sending the heavier hydrocarbon portion to a column to be separated into a light hydrocarbon portion comprising methane and ethane exiting a top of the column, a heavy hydrocarbon portion exiting a bottom of the column comprising pentanes and heavier hydrocarbons and a middle portion comprising butanes and propanes. In an embodiment of the invention, the middle portion is sent to a side stripper and a reboiler to be divided into a vapor portion comprising methane and ethane and a natural gas liquids portion. The heavy hydrocarbon portion may be passed through a stabilizer reboiler to produce a stabilized natural gasoline product and a lighter hydrocarbon portion to be returned to the column for further separation. Three product streams can be produced comprising a natural gasoline product stream, a natural gas liquids product stream and a methane/ethane product stream which then may be further processed to produce a methane and an ethane stream. At least a portion of the natural gasoline product stream or the natural gas liquids product stream may be sent to the absorber to serve as the lean oil stream.

The invention further comprises a system for purifying a hydrocarbon stream comprising a lean oil absorber for separating a stream into a vapor stream and a heavier hydrocarbon stream; a column for separating the heavier hydrocarbon stream into a vapor stream, a heavy hydrocarbon stream and a butane/propane stream; a side stripper with a side stripper reboiler for removing lighter hydrocarbons from said butane/propane stream and a stabilizer reboiler for stabilizing the heavy hydrocarbon stream which may be a natural gasoline stream.

BRIEF DESCRIPTION OF THE DRAWING

The FIGURE provides a flow scheme illustrative of the invention for purifying a hydrocarbon stream and producing a natural gasoline stream, a propane/butane stream and a methane/ethane vapor stream.

DETAILED DESCRIPTION OF THE INVENTION

The FIGURE shows one illustrative system employing a lean oil absorber combined with a stabilization system. A quantity of low pressure drip liquid (if needed) 2 is shown entering absorber 6 that contains lean oil. A feed gas 4 to be purified is also entering the absorber 6. The light hydrocarbons 8 exit the top of the absorber and can be sent for further processing including removal of ethane from a predominantly methane stream. The heavier hydrocarbons including propanes and butanes exit the bottom of the absorber and go through line 10 to a valve 12 and then line 14 to be further separated in column 16. A vapor off gas portion 24 exits the top of the column and passes through stabilizer off gas compressor 26 through line 28 for NGL recovery to stabilizer recycle compressor 30 to line 32 to be combined with the stream of light hydrocarbons 8 for further processing. A water draw 22 is removed from the column 16. Column 16 has a blank tray with no active surface 18 and a liquid backup weir 20 for separation of a stream 24 that is rich in propanes and butanes. Stream 84 is sent to side draw air cooler 86 to free drain 88 and then to side stripper 80. A vapor portion 82 exits the top of side stripper 80 to be returned to column 16. The heavier portion containing the majority of the propane and butane portion pass through line 34 to side stripper reboiler 36. A lighter hydrocarbon portion 40 is returned to side stripper 30. A heavier portion 38 is removed as NGL Y-grade to meet specifications for low content methane and ethane in a propane/butane product. A lean oil product is removed at line 42, through pump 44 to line 46, lean oil/gasoline product cooler 48 to line 50, pump 52, line 54 to valve 56, line 58 and returned to absorber 6. A mainly natural gasoline portion 60 that comprises mainly pentanes and heavier hydrocarbons exits the bottom of column 16 to stabilizer reboiler 62 and through line 64 to column 16. The stabilized natural gasoline is either sent through line 66 to valve 68 to line 70 to side stripper reboiler 36 or joins line 42 to be a portion of the lean oil that is used in absorber 8.

Specific Embodiments

While the following is described in conjunction with specific embodiments, it will be understood that this description is intended to illustrate and not limit the scope of the preceding description and the appended claims.

A first embodiment of the invention is a process for purifying a hydrocarbon stream comprising (a) sending the hydrocarbon stream through a lean gas absorber; (b) sending a vapor stream out a top of the lean gas absorber; (c) sending a heavier hydrocarbon portion out a bottom of the lean gas absorber; and (d) sending the heavier hydrocarbon portion to a column to be separated into a light hydrocarbon portion comprising methane and ethane exiting a top of the column, a heavy hydrocarbon portion exiting a bottom of the column comprising pentanes and heavier hydrocarbons and a middle portion comprising butanes and propanes. An embodiment of the invention is one, any or all of prior embodiments in this paragraph up through the first embodiment in this paragraph wherein the middle portion is sent to a side stripper and a reboiler to be divided into a vapor portion comprising methane and ethane and a natural gas liquids portion. An embodiment of the invention is one, any or all of prior embodiments in this paragraph up through the first embodiment in this paragraph wherein the heavy hydrocarbon portion is passed through a stabilizer reboiler to produce a stabilized natural gasoline product and a lighter hydrocarbon portion to be returned to the column for further separation. An embodiment of the invention is one, any or all of prior embodiments in this paragraph up through the first embodiment in this paragraph wherein three product streams are produced comprising a natural gasoline product stream, a natural gas liquids product stream and a methane/ethane product stream. An embodiment of the invention is one, any or all of prior embodiments in this paragraph up through the first embodiment in this paragraph wherein the methane/ ethane product stream is further separated into a methane product stream and an ethane product stream. An embodiment of the invention is one, any or all of prior embodiments in this paragraph up through the first embodiment in this paragraph wherein at least a portion of the natural gasoline product stream or the natural gas liquids product stream is sent to the absorber as a lean oil stream.

A second embodiment of the invention is a system for purifying a hydrocarbon stream comprising a lean oil absorber for separating a stream into a vapor stream and a heavier hydrocarbon stream; a column for separating the heavier hydrocarbon stream into a vapor stream, a heavy hydrocarbon stream and a butane/propane stream; a side stripper with a side stripper reboiler for removing lighter hydrocarbons from the butane/propane stream and a stabilizer reboiler for stabilizing the heavy hydrocarbon stream.

Without further elaboration, it is believed that by using the preceding description, one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for purifying a hydrocarbon stream comprising:
    (a) sending said hydrocarbon stream through a lean gas absorber;
    (b) sending a vapor stream out a top of said lean gas absorber and a stream comprising propanes and butanes out of a bottom of said lean gas absorber; and
    (d) then sending the stream comprising propanes and butanes to a column to be separated into a light hydrocarbon portion comprising methane and ethane exiting a top of said column, a heavy hydrocarbon portion comprising pentanes and exiting a bottom of said column comprising pentanes and heavier hydrocarbons than pentanes and a middle portion comprising butanes and propanes
    wherein said middle portion is sent to a side stripper and a reboiler to be divided into a vapor portion comprising methane and ethane and a natural gas liquids portion.

2. The process of claim 1 further comprising passing said pentanes and hydrocarbons heavier than pentanes are through a stabilizer reboiler to produce a stabilized natural gasoline product and a lighter hydrocarbon portion that comprises lighter hydrocarbons than said stabilized natural gasoline portion to be returned to said column for further separation.

3. The process of claim 1 wherein three product streams are produced comprising a natural gasoline product stream, a natural gas liquids product stream and a methane and ethane product stream.

4. The process of claim 3 further comprising separating said methane and ethane product stream into a methane product stream and an ethane product stream.

5. The process of claim 3 wherein at least a portion of said natural gasoline product stream or said natural gas liquids product stream is sent to said absorber as a lean oil stream.

6. A system for purifying a hydrocarbon stream comprising a lean oil absorber for separating a stream into a vapor stream and a heavier hydrocarbon stream comprising hydrocarbons heavier than said vapor stream; a column for separating said heavier hydrocarbon stream into a vapor stream, a heavy hydrocarbon stream comprising pentanes and heavier hydrocarbons and a butane and propane stream;

a side stripper with a side stripper reboiler for removing lighter hydrocarbons than butanes and propanes from said butane and propane stream and a stabilizer reboiler for stabilizing said heavy hydrocarbon stream.

* * * * *